US006800981B2

(12) United States Patent
Kuhlmann-Wilsdorf

(10) Patent No.: US 6,800,981 B2
(45) Date of Patent: Oct. 5, 2004

(54) TUBULAR BRUSH HOLDER

(75) Inventor: Doris Kuhlmann-Wilsdorf, Charlottesville, VA (US)

(73) Assignee: Hipercon, LLC, Delaplane, VA (US)

( * ) Notice: Subject to any disclaimer, the term of this patent is extended or adjusted under 35 U.S.C. 154(b) by 0 days.

(21) Appl. No.: 10/134,686

(22) Filed: Apr. 30, 2002

(65) Prior Publication Data

US 2003/0071536 A1 Apr. 17, 2003

Related U.S. Application Data

(60) Provisional application No. 60/286,969, filed on Apr. 30, 2001.

(51) Int. Cl.[7] .......... H02K 13/00

(52) U.S. Cl. .......... 310/239; 310/242; 310/245; 310/251

(58) Field of Search .......... 310/239, 240, 310/242, 244, 245, 248, 249, 251, 252, 253, 246, 247, 329

(56) References Cited

U.S. PATENT DOCUMENTS

| | | | | | |
|---|---|---|---|---|---|
| 3,308,321 | A | * | 3/1967 | Provost, Jr. | 310/239 |
| 4,246,508 | A | * | 1/1981 | Zimmer | 310/242 |
| 4,267,912 | A | * | 5/1981 | Bauer et al. | 192/53.34 |
| 5,114,351 | A | * | 5/1992 | Hoffmann | 439/13 |
| 5,621,262 | A | * | 4/1997 | Han | 310/239 |
| 5,631,513 | A | * | 5/1997 | Coles et al. | 310/239 |

* cited by examiner

*Primary Examiner*—Tran Nguyen
*Assistant Examiner*—Leda Pham
(74) *Attorney, Agent, or Firm*—Oblon, Spivak, McClelland, Maier & Neustadt, P.C.

(57) ABSTRACT

A brush holder including a tubular brush box, a baseplate configured to be fastened to an electrical brush and movable in the brush box, a resilient multi-contact lining disposed in the brush box between the baseplate and an inner wall of the brush box, and a spring applying a force to the baseplate in a predetermined direction.

6 Claims, 4 Drawing Sheets

TUBULAR BRUSH HOLDER

CROSS-REFERENCE TO RELATED APPLICATIONS

This application claims the benefit of priority to U.S. Provisional Application Ser. No. 60/286,969, filed on Apr. 30, 2001, the entire contents of which are incorporated herein by reference.

DESCRIPTION OF THE INVENTION

The present invention proposes a new brush holder for metal fiber and metal foil brushes. It is designed to guide the brush in axial direction as it wears even while a constant light brush pressure is exerted and a large current is conducted to or from the brush at very low electrical resistance. The invention is depicted in FIGS. 1A to 1E and is called the "tubular brush holder."

Figure 1A:
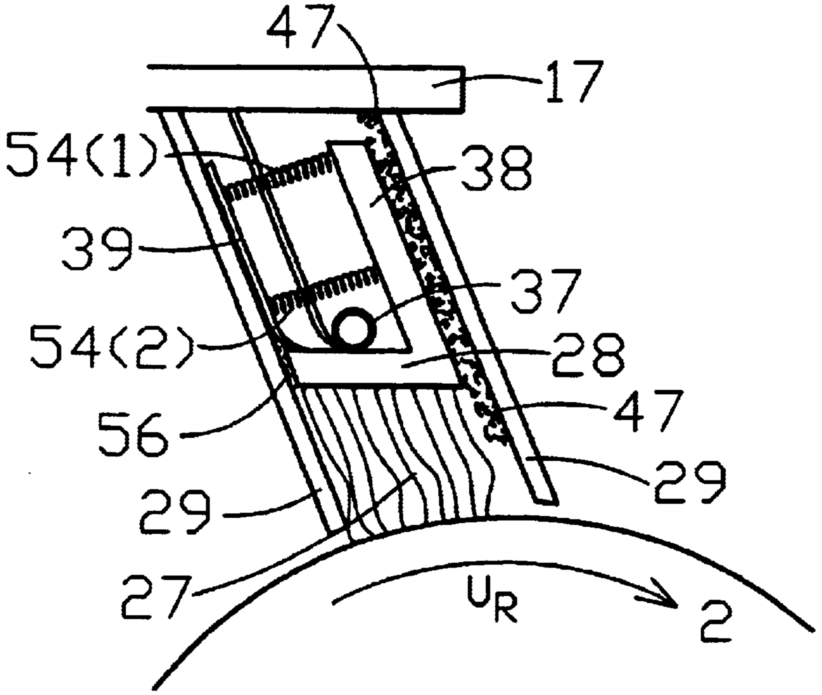
Figure 1B:
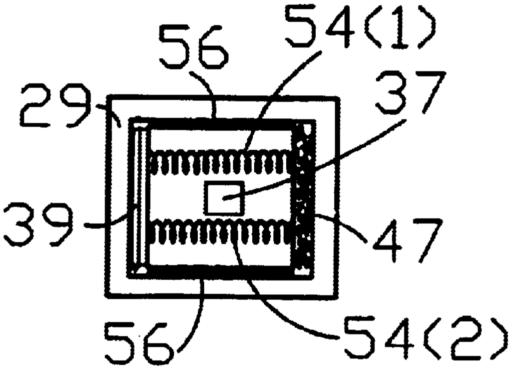

In the version of FIGS. 1A and 1B, fiber brush 27 is conductively fastened to metal baseplate 28 and is pushed forward in electrically conductive brush box 29 by constant force spring 37 so as to load brush 27 against rotor 2 with the desired brush force. At least one of the four long sides of the inside of brush box 29 is lined in an electrically conductive manner with resilient multi-contact metal material 47, i.e., in the form of metal velvet, metal felt, strands of fine metal fibers, metal fibers combined in the manner of textiles, e.g., through weaving or knitting or any other. At least one metal guide 38 is rigidly, electrically conductive attached to base plate 28 in such a manner that it is parallel to at least one side of the brush box that is lined with resilient multi-contact metal material 47 and is disposed so that it guides fiber brush 27 along the inside of brush box 29 while the brush wears.

Low-resistance electrical contact is established between the at least one guide 38 and at least one multi-contact metal material by means of at least one compression spring 54 (in this case depicted as helical springs 54(1) and 54(2) extending between guide 38 and a thin low-friction plate 39 that is flexibly hinged to baseplate 28 disposed so that it is parallel to the at least one metal guide 38. Teflon may be a particularly suitable material for hinged low-friction plate 39. For further stabilization of the brush motion, the remaining inner surfaces of the brush box may be provided with low-friction liner or the edges of base plate 28 may be lined with a low-friction material such as Teflon. Such a liner is indicated by number 56.

The spring action between guide 38 and hinged low-friction plate may be provided by at least one conventional spring, e.g., a helical spring, or by at least one constant force spring. The spring force is adjusted to compare with the brush force exerted on fiber brush 27 by means of constant force spring 37. The friction force due to the described elastic compression of the multi-contact metal material 47 and metal guide 38 will reduce the brush force on fiber brush 27 by about 30% of the force imposed by constant force spring 37, for the reason that the coefficient of friction between multi-contact metal material and smooth metals is in the range of 0.2 to 0.3.

The contact resistance between brush box 29 and fiber brush 27 via the resilient multi-metal material 47 will be about one half of the electrical resistance between the brush and rotor 2 since static multi contacts have about one half of the resistance of similar sliding contacts under same pressure (compare C. M. Adkins III and D. Kuhlmann-Wilsdorf, "Devleopment of high-performance Metal Fiber Brushes II—Testing and Properties", Electrical Contacts—1979 (Proc. Twenty-Fifth Holm Conf. On Electrical Contacts, III. Inst. Techn., Chicago, Ill., 1979), pp. 171–184, the entire contents of which is incorporated by reference herein.), provided that the surfaces are clean. This is a requirement that must be fulfilled, either by operating in a protective atmosphere such as humidified $CO_2$ or making the contact surface between multi contact metal material and slider of noble metal or plating with a noble metal.

In cases of high packing density of brush holders, e.g., as may be the case in homopolar motors, the outside of the brush box should be coated with a nonconductive paint or lacquer, e.g., red stop-off lacquer.

Figure 1C:
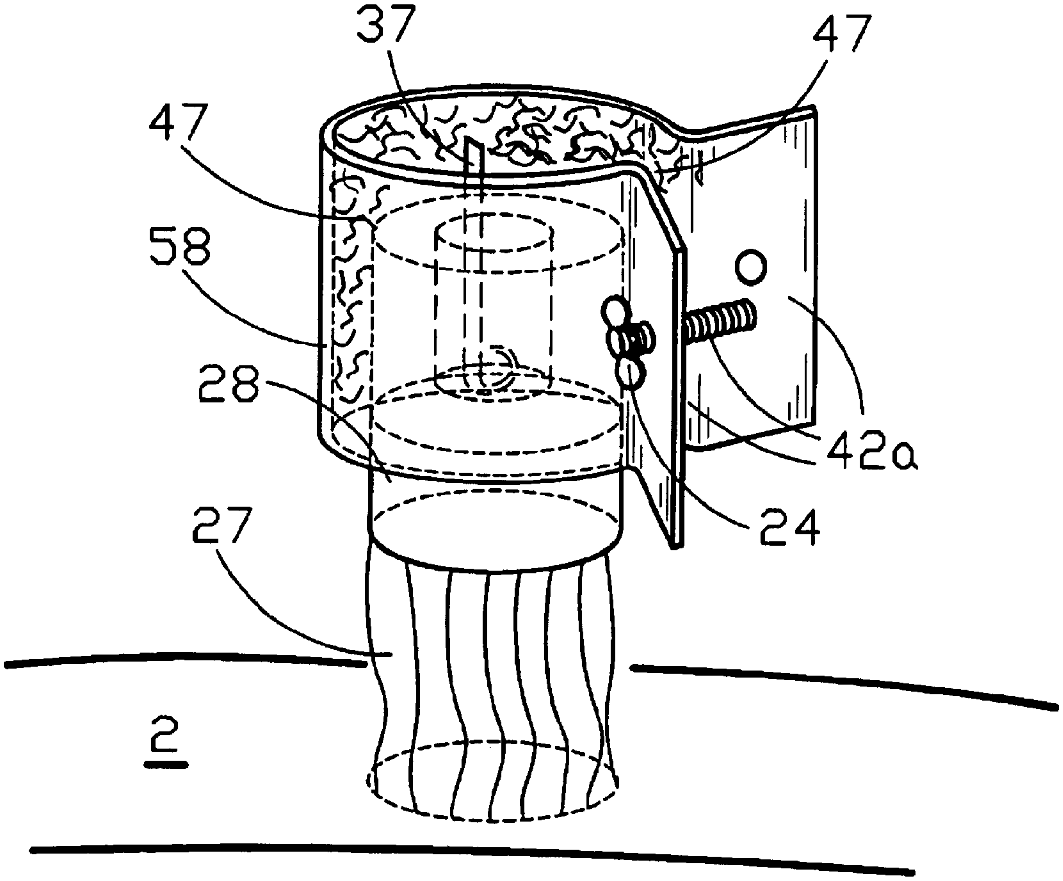
Figure 1D:
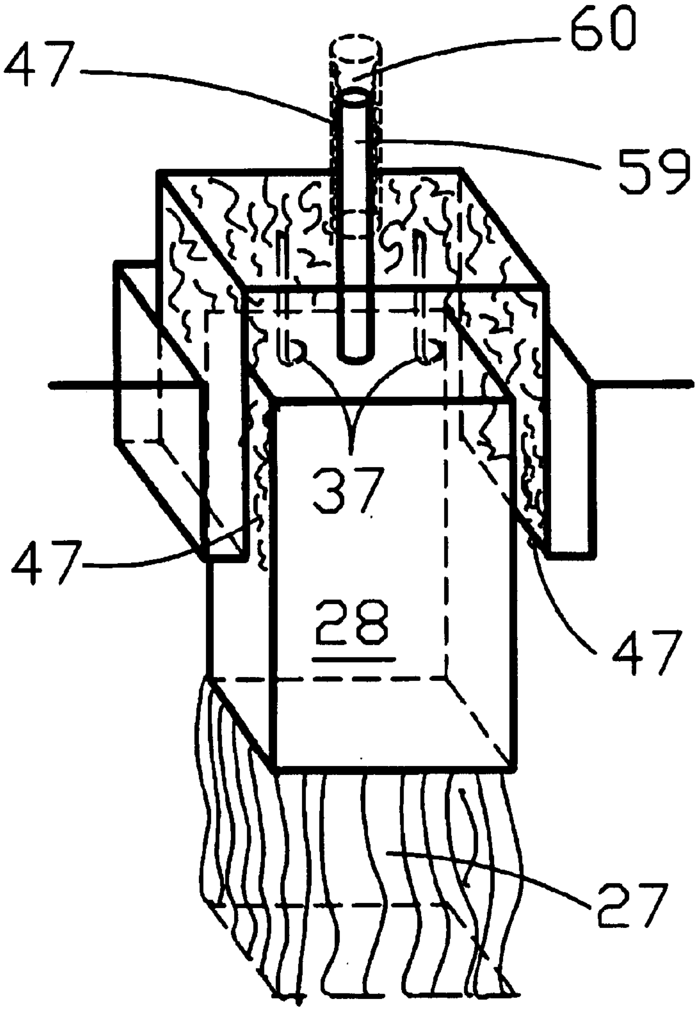
Figure 1E:
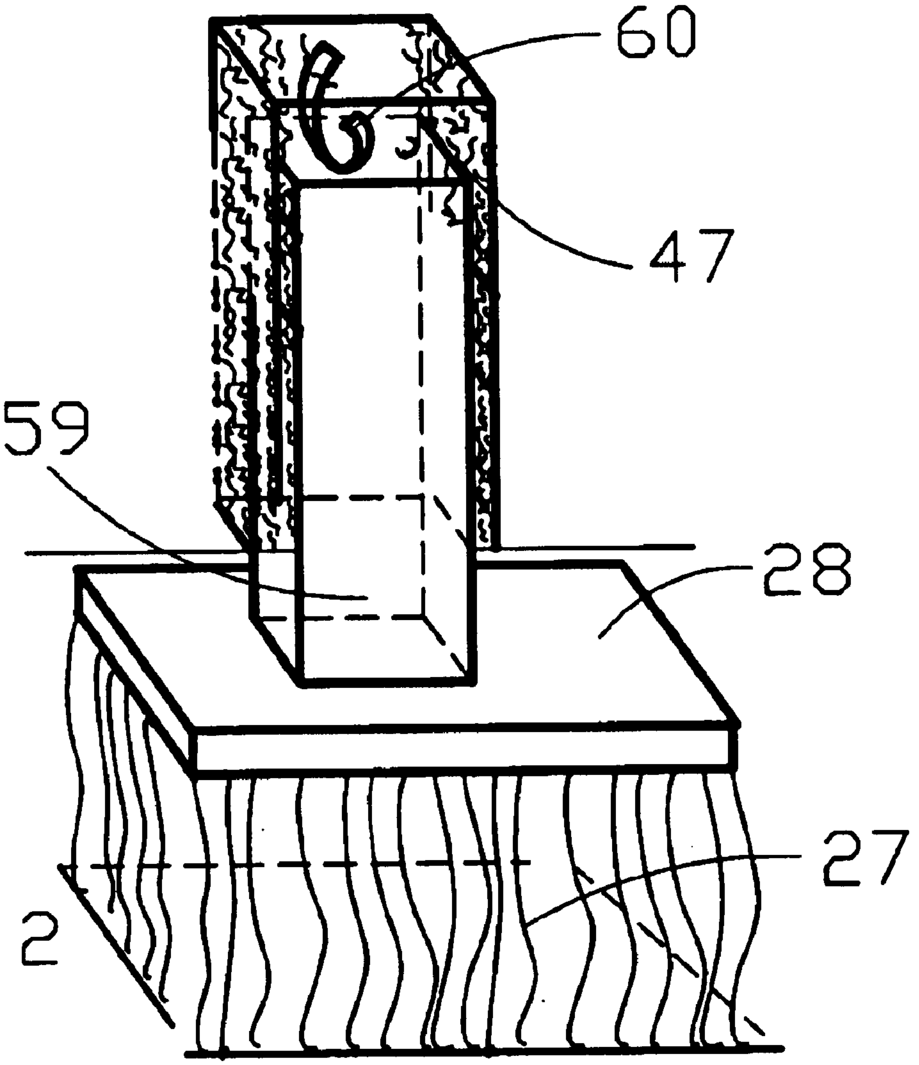

For a particular application, the tubular brush holder designed in FIGS. 1A and 1B may be too costly or requires too much space. In fact restricted space for bushes is a perennial problem for homopolar motors since their appeal derives from their potentially large power to weight ratio and, due to the typically low voltage per current turns, they require large numbers of brushes. FIGS. 1C to 1E therefore show simplifications of the concept of the tubular brush holder according to the present invention that are designed both to save space and cost.

In FIG. 1C, the dual function of guiding the brush axially with minimal friction while it wears and conducting current of the brush at very low resistance, is performed by the releasable conductive clamping mechanism 42*a* that comprises a flexible metal ring with spring action 58 that is lined with resilient multi-contact metal material. An optimum compromise between friction and electrical resistance can be achieved by adjusting the wing nut 24, since tightening it will decrease resistance but increase friction and vice versa.

However, this is just one example of how to construct a releasable clamping mechanism. For example, the clamping mechanism 42*a* may apply to a stem extending from the base plate or some metal guide as in FIGS. 1A and 1B. Also a matter of choice will be the means whereby clamping mechanism 42*a* may be releasably but rigidly mechanically fastened to the stator. One possibility would be to provide a screw thread at the upper end of 42*a* such that it does not interfere with the spring action due to the wing nut acting on the flexible metal ring 58 and a matching threaded hole in the stator. Another would be to similarly provide a dovetail at clamping device 42*a* and a female receptacle for such a dovetail in the stator.

Still another version of the tubular brush holder is shown in FIG. 1D where the brush is guided by a cavity in the stator that is lined with resilient multi-contact metal material. Here that guidance is optionally supplemented by a stem 59 stem extending in axial direction from the brush base plate 28 and guided in hole 60 in the stator that may be optionally lined with resilient multi-contact metal material. In this example the brush force is applied by two constant force springs. The advantage of this version of the tubular brush holder is its still greater simplicity, but it lacks the possibility of adjusting the pressure between the multi-contact material and the brush base plate.

The simplest tubular brush holder is shown in FIG. 1E, wherein the brush is guided by stem 59 in hole 60 lined with resilient multi-contact metal material 47 and is subject to the brush pressure applied by constant force spring 37.

A common feature of all tubular brush holders, shown in FIGS. 1A to 1E and any other modifications, is that the current is transferred between stator and brush by means of low-friction, low resistance resilient multi-contact metal material that is electrically connected to the current supply or load and is mechanically rigidly attached to the stator.

What is claimed is:

1. A brush holder comprising:

a tubular brush box;

a baseplate configured to be fastened to an electrical brush and movable in the brush box;

a resilient multi-contact lining disposed in the brush box between the baseplate and an inner wall of the brush box;

a sprint configured to apply a force to the baseplate in a predetermined direction; and at least one guide coupled to the baseplate and extending along the inner wall of the brush box, the lining disposed between the guide and the inner wall of the brush box.

2. The brush holder according to claim 1, further comprising:

a low-friction plate flexibly hinged to the base plate; and a second spring configured to urge the low-friction plate and the at least one guide apart.

3. A brush holder comprising:

a tubular brush box;

a baseplate configured to be fastened to an electrical brush and movable in the brush box;

a resilient multi-contact lining disposed in the brush box between the baseplate and an inner wall of the brush box, the lining comprising at least one of a metal velvet, a metal felt and a metal fiber;

a spring configured to apply a force to the baseplate in a predetermined direction; and at least one guide coupled to the baseplate and extending along the inner wall of the brush box, the lining disposed between the guide and the inner wall of the brush box.

4. The brush holder according to claim 3, further comprising:

a low-friction plate flexibly hinged to the base plate; and a second spring configured to urge the low-friction plate and the at least one guide apart.

5. A brush holder comprising:

a brush box;

a baseplate configured to be fastened to an electrical brush and movable in relative to the brush box;

a resilient multi-contact lining disposed in the brush box between the baseplate and an inner wall of the brush box;

a resilient member configured to urge the baseplate in a predetermined direction; and a guide portion connected to and extending from the baseplate adjacent to at least a portion of the resilient member.

6. A brush holder comprising:

a brush box;

a baseplate configured to be fastened to an electrical brush and movable relative to the brush box;

a resilient multi-contact lining disposed in the brush box between the baseplate and an inner wall of the brush box;

a resilient member configured to urge the baseplate in a predetermined direction; and a guide portion coupled to the baseplate and extending along the inner wall of the brush box, the lining disposed between the guide and the inner wall of the brush box.

* * * * *